Oct. 14, 1969      A. HALPERT      3,472,381
AQUARIUM FILTER DEVICE
Filed July 31, 1967      2 Sheets-Sheet 1
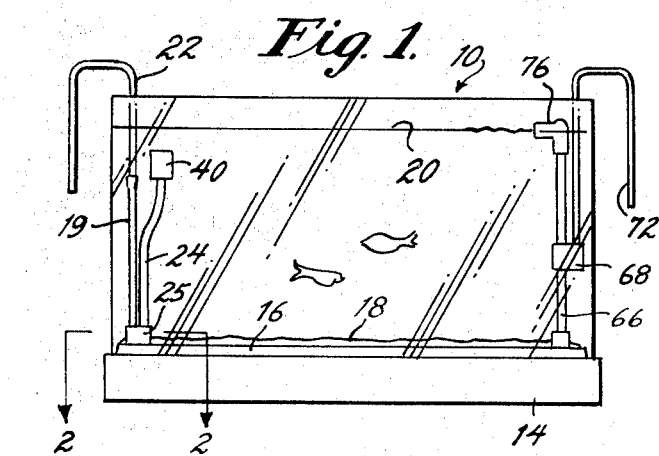
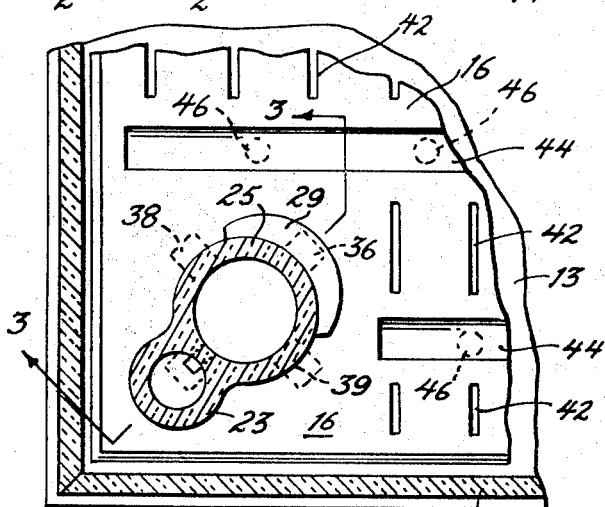
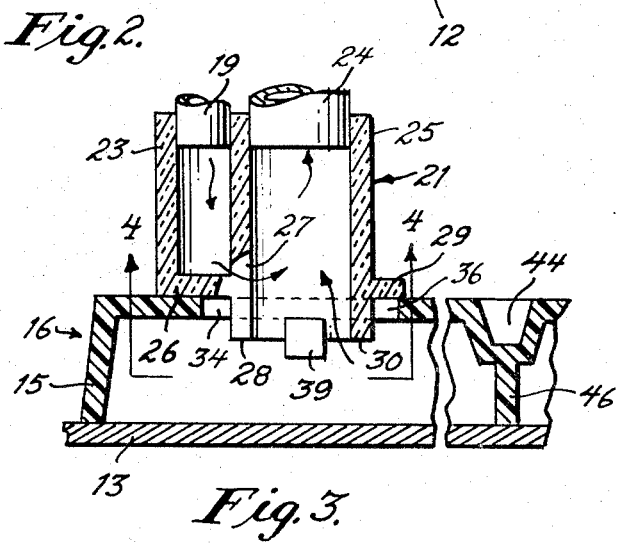
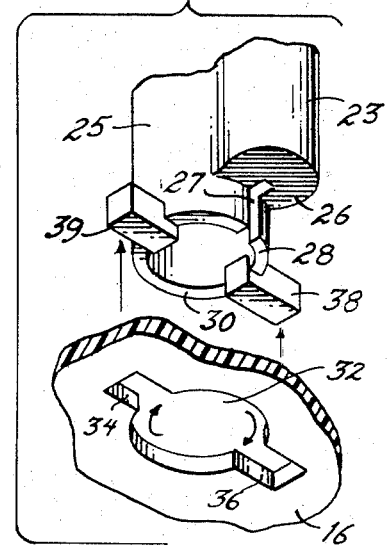
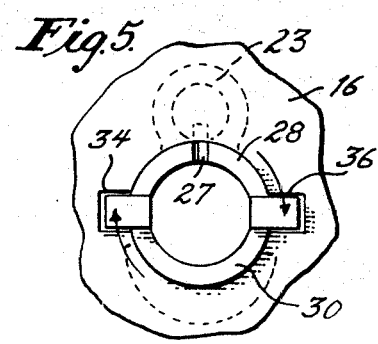
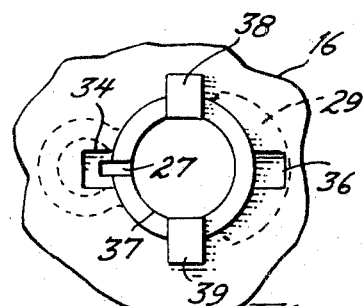
INVENTOR.
ABBY HALPERT
BY Seidel & Gonda
ATTORNEYS.

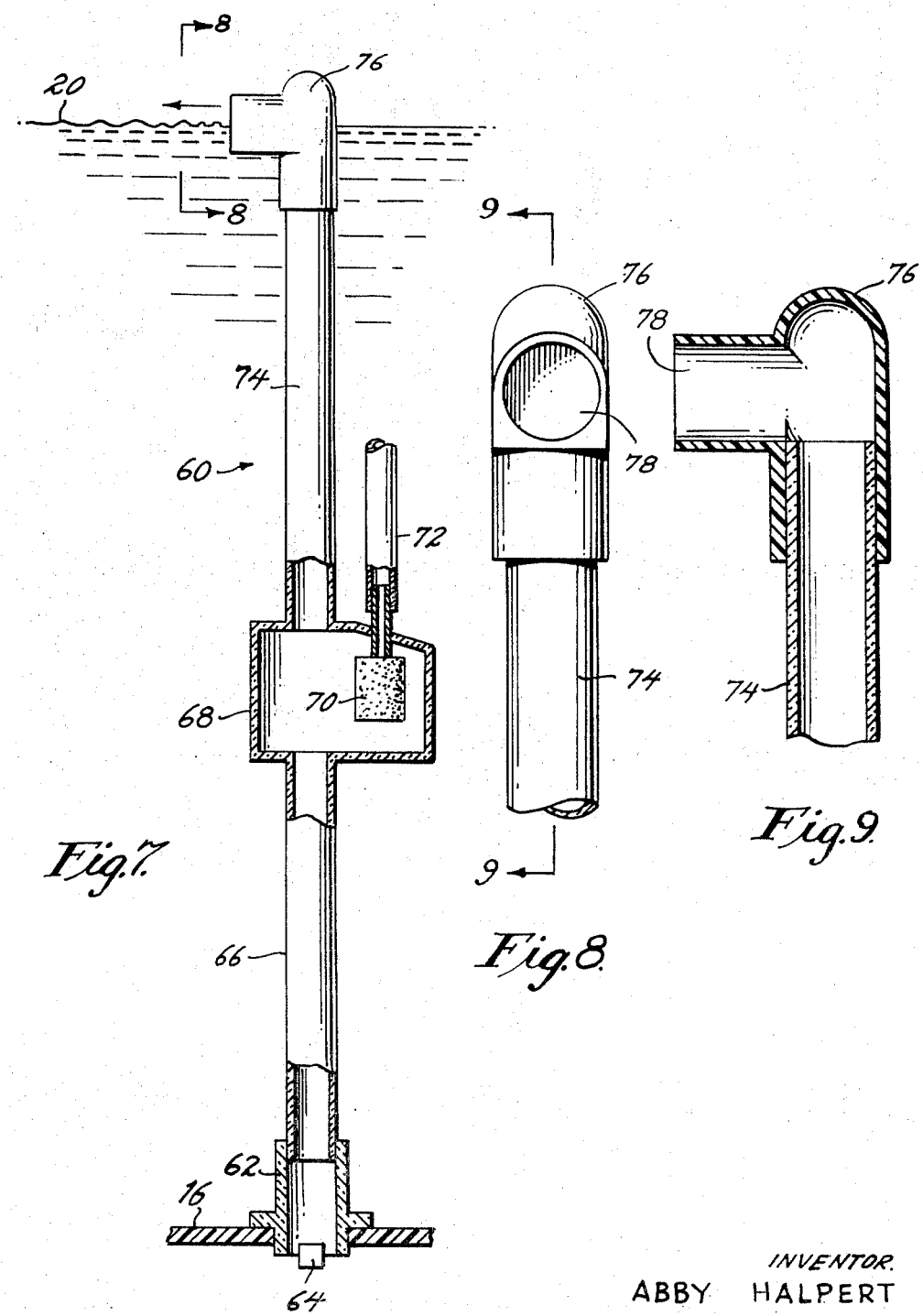

United States Patent Office 3,472,381
Patented Oct. 14, 1969

3,472,381
AQUARIUM FILTER DEVICE
Abby Halpert, Brooklyn, N.Y., assignor to Halvin Products Co., Inc., Brooklyn, N.Y., a corporation of New York
Filed July 31, 1967, Ser. No. 657,389
Int. Cl. E04h 3/20
U.S. Cl. 210—169                                  7 Claims

ABSTRACT OF THE DISCLOSURE

A quick disconnect coupling is provided between the aquarium gravel bed filter and the connector for the air and riser conduits so that coupling and uncoupling may be made without removing said filter when the connector or conduits are clogged.

This invention relates to an aquarium filter device of the type shown in Patents 2,935,199 and 3,151,069. In said patents, there is disclosed an aquarium tank having a filter supported by the bottom of the tank and above which is provided a layer of gravel, sand, or other granular media. The water filters through the gravel bed, through slots in the filter, and is returned to the remainder of the water in the aquarium by way of a riser conduit terminating in a filter. The gravel bed provides coarse filtration whereas the filter at the terminal end of the riser conduit provides a more selective filtration. Water is caused to circulate up through the riser conduit by introducing air into the riser conduit.

In the above-mentioned patents, removal of the connector and/or riser conduit and air conduit is extremely difficult without removing the entire assembly from the tank. When this is done, the removal of the gravel and/or filter plate substantially stirs the water in the tank which requires a substantial period of time before the suspended particles gravitate to the filter bed. The present invention is constructed in a manner whereby the conduits and/or connector may be readily removed with only minor disturbance of the gravel bed and without disturbing the bed filter.

It is an object of the present invention to provide a novel aquarium filter device wherein components thereof may be removed and replaced without disturbing the filter bed or the bed filter.

It is another object of the present invention to provide a novel air and riser conduit connector adapted to be rapidly connected and disconnected with respect to a bed filter without moving the bed filter for supporting a riser conduit in an aquarium.

It is another object of the present invention to provide a novel conduit-filter connector which is simple, inexpensive, and reliable.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a side elevation view of an aquarium.

FIGURE 2 is a partial sectional view taken along the line 2—2 in FIGURE 1.

FIGURE 3 is a sectional view taken along the line 3—3 in FIGURE 2.

FIGURE 4 is a bottom view taken along the line 4—4 in FIGURE 3.

FIGURE 5 is a bottom view similar to FIGURE 4 but with components rotated 90°.

FIGURE 6 is an exploded view showing the relationship between the filter and connector.

FIGURE 7 is an enlarged sectional view of the rippler at the right side of FIGURE 1.

FIGURE 8 is a view taken along the line 8—8 in FIGURE 7.

FIGURE 9 is a sectional view taken along the line 9—9 in FIGURE 8.

Referring to the drawing in detail, wherein like numerals indicate like elements, there is shown in FIGURE 1 an aquarium designated generally as 10. The aquarium 10 includes a tank 12 having a bottom wall 13 resting on a frame 14. A gravel bed filter 16 overlies the bottom wall 13 of the tank 12 and is spaced therefrom by a peripheral rim 15. A layer of gravel, sand, or other granular media 18 overlies the filter 16.

The liquid level of the water in aquarium tank 12 is designated as 20. An air tube or conduit 22 extends into the water in tank 12. The exposed end of conduit 22 is adapted to be connected to an air compressor. The lower end of the tube 22 within the tank 12 is connected to the tube 19 which is connected to the upper open end of tube 23 forming a part of a detachable connector 21. An air riser conduit 24 is provided within the tank 12. The lower end of conduit 24 is connected to the open end of tube 25 forming a part of the connector 21.

The connector 21 is an integral member, preferably made from a polymeric plastic material having a small tube or extension 23 integral with a larger tube 25. Tubes 23 and 25 communicate with one another by way of passage 27 in the wall common to the tubes at the bottom of tube 23. Tube 23 is provided with an otherwise closed bottom wall 26. Tube 25 is provided with spaced end faces 28 and 30 each being semi-circular. Tube 25 is provided with a radially outwardly directed boss 29 diametrically opposite tube 23.

The connector 21 is adapted to be rapidly coupled and uncoupled with respect to the filter 16 without interfering with the filter 16. Filter 16 is provided with a hole 32 having diametrically opposite outwardly directed slots 34 and 36. Hole 32 is of a diameter so as to receive tube 25 with minimal clearance. Tube 25 is provided at its lower end with integral radially outwardly directed ears 38 and 39. The ears 38 and 39 are adapted to pass through the slots 34 and 36 as shown more clearly in FIGURE 5.

The lower surface on boss 29 lies in the same plane as the bottom wall 26 of tube 23. The distance from that plane to upper surface on the ears 38 and 39 is slightly greater than the thickness of the top wall on filter 16. Hence, the connector may be rotated from the position shown in FIGURE 5 to the position shown in FIGURE 4, thereby interconnecting these components in the assembled relationship as shown.

The conduits 19 and 24 may be fixedly or removably coupled to their respective tubes 23 and 25. The upper end of conduit 24 is preferably provided with a filter cartridge 40 comparable to that disclosed in my above-mentioned Patent 3,151,069.

As shown more clearly in FIGURES 2 and 3, the filter 16 is provided with an integral depending rim 15 with its upper surface having rows of slots 42. Longitudinally extending grooves 44 are provided between adjacent ones of the rows of slots 42. As shown more clearly in FIGURE 3, the grooves are provided with integral depending pins 46 at spaced points therealong. The pins 46 contact the bottom wall 13 and provided support for the central portion of the filter 16 so that it may support the bed 18 without collapsing.

The operation of the aquarium is believed to be obvious to those skilled in the art. Air is introduced into conduit 22, through conduit 19, into tube 23, through passage 27, into tube 25, and then rises up conduit 24. See the arrows in FIGURE 3. The aerated water rising up conduit 24 creates a circulation of water from within the tank 12 downwardly through the bed 18, through the slots 42 and into the space below filter 16. The water below filter 16 is then caused to rise up conduit 24. The bed 18 performs a gross filtration whereas finer filtration is performed by the filter cartridge 40 before the water is permitted to re-enter the main body of water within the tank 12.

The structural interrelationship described permits the filter 16 to be placed within the tank 12 and substantially covered with gravel 18 except for the area around hole 32. Thereafter, the connector and the conduits 22 and 24 may be connected. In the above-mentioned patents, conduits 19 and 24 must be connected to the filter before the filter is placed in the tank. During operation, the conduits 24 and the connector have a tendency to become clogged with foreign matter including a part of the bed 18 which has passed downwardly through the slots 42. In order to remove the connector, it need only be rotated 90° from the position shown in FIGURE 4 wherein the ears 39 and 38 overlie the bottom surface of filter 16 to the position shown in FIGURE 5 wherein the ears are aligned with the slots 34 and 36. Thereafter, the connector may be raised vertically and separated from the filter. If desired, conduits 19 and 24 may have previously been uncoupled from the connector 21. Also, the portion of the bed 18 immediately adjacent the connector 21 should be moved so that that portion of the bed does not fall through the hole 32. When rotating the connector 21 with respect to the filter 16, the bottom wall 26 on tube 23 and the boss 29 ride on the upper surface of filter 16 so as to prevent cocking of the connector 21.

The aquarium 10 may be provided with a rippler designated generally as 60 and shown in detail in FIGURE 7. The rippler 60 includes a connector 62 having ears 64. Connector 62 is adapted to be connected to the filter 16 in the same manner as connector 21. Hence, the structure of connector 62 need not be described in detail.

The lower end of a conduit 66 is connected to the connector 62. The upper end of conduit 66 communicates with a chamber 68. An air stone 70 is provided within chamber 68. Air is adapted to be communicated to the air stone and into the chamber 68 from conduit 72 adapted to be connected to a compressor.

A conduit 74 has its lower end communicating with the chamber 68. A L-shaped portion 76 is connected to the upper end of conduit 74. Portion 74 has a discharge port 78. The elevation of port 78 corresponds to the level 20.

Air introduced into chamber 68 from stone 70 and conduit 72 causes water to rise upwardly through connector 62, conduit 66. chamber 68, conduit 74, and discharges through port 78 at the level 20. The discharging water which has been aerated, creates a ripple at the level 20. The motion of uowing water attained by the rippler 60 is beneficial to the fish and gives the water the appearance of a babbling brook. Hereinafter, conduit 74 may be referred to as a riser conduit. L-shaped portion 76 is preferably rotatable with respect to rise conduit 74 so that the direction of the ripples may be varied as desired.

I claim:

1. An aquarium device comprising a generally horizontal bed filter having a generally horizontal top wall, an upright air riser conduit supported by said filter, a connector removably interconnecting said conduit to said filter, said filter having a hole receiving a portion of the connector, at least one ear on the lower end of the connector, means for enabling said ear to enter through said hole and lie in a plane below the hole while projecting radially outwardly beyond the periphery of the hole, said connector having a portion in overlying contact with said filter so as to limit the extent to which the connector may enter said hole, wherein the distance between said ear and said connector portion is slightly greater than the thickness of the top wall of said bed filter, and an air delivery conduit communicating with said riser for delivering air to said riser conduit adjacent the lower end thereof.

2. A device in accordance with claim 1 wherein said connector includes an air conduit extension integral with a tube and having a common wall therebetween, and a communicating passage at least partially in the bottom wall of said extension so that air may enter the riser conduit which communicates with the tube.

3. A device in accordance with claim 1 wherein the connector is rotatable in said hole.

4. A device in accordance with claim 1 wherein said connector is separate from and removably coupled to said riser conduit, said hole having a slot through which said ear may pass, said connector being rotatable in said hole so that the ear may be rotated to a position removed from the slot.

5. A device in accordance with claim 1 including a second filter connected to the upper end of said riser conduit.

6. A device in accordance with claim 1 including means connected to the upper end of said riser conduit for delivering aerated water to the liquid level for causing ripples.

7. An aquarium device comprising an aquarium tank, a bed filter overlying the bottom of the tank, a pair of spaced riser conduits, a separate connector coupled to each conduit and supported by said filter, one conduit terminating in a filter at its upper end portion, means connected to the upper end portion of the conduit for causing ripples at liquid level, and separate means for introducing air into the conduits.

References Cited

UNITED STATES PATENTS

| 744,646 | 11/1903 | Tietz | 285—376 X |
| 2,769,779 | 11/1956 | Vansteenkiste et al. | 210—169 X |
| 3,006,476 | 10/1961 | Halpert | 210—169 |
| 3,035,702 | 5/1962 | Marvin | 210—169 |
| 3,119,774 | 1/1964 | Arak | 210—169 |

REUBEN FRIEDMAN, Primary Examiner

T. A. GRANGER, Assistant Examiner

U.S. Cl. X.R.

119—5